3,268,579
PREPARATION OF ACRYLIC ACID
Edwin Marvin Smolin, Springdale, Conn., assignor to American Cyanamid Company, New York, N.Y., a corporation of Maine
No Drawing. Filed Dec. 29, 1961, Ser. No. 163,038
6 Claims. (Cl. 260—533)

This invention relates to a novel method for preparing acrylic acid. More particularly, the invention relates to an improvement in nickel salt-copper salt-catalyzed liquid-phase reactions at elevated temperatures and pressures of equivalent amounts of acetylene, carbon monoxide and water. Still more specifically, it is concerned with an improvement in carrying out such a reaction whereby the time required for its completion is substantially reduced.

It is known that equivalent quantities of acetylene, carbon monoxide and water may be reacted in the liquid phase to give acrylic acid providing elevated temperatures, elevated pressures and a nickel salt-copper salt catalyst combination are used. However this process is not entirely satisfactory and leaves much to be desired. For example, in high pressure liquid-phase reactions as previously practiced, the time for initiating the reaction is unduly long. In the continuous synthesis of acrylic acid, there is usually a considerable lapse of time, for example, from five to fifteen hours before the reaction proceeds at a satisfactory rate, all materials being fed continuously and proportionally. This long induction period requires long residence times for the completion of the high pressure liquid-phase reaction process and not infrequently polymerization and other reactions of acrylic acid occur with attendant loss of yield.

Since acrylic acid finds extensive use in the manufacture of synthetic resins for application in surface coatings, adhesives, etc. as well as in the formation of acrylic acid esters capable of similar end uses, an improved procedure for its manufacture has long been desired.

While numerous modifications in the general process for the nickel salt-copper salt-catalyzed liquid-phase reaction at elevated temperatures and pressures of acetylene, carbon monoxide and water have been made, nevertheless, the problem of shortening or lessening the induction period and, of course, the overall reaction time has not to the present been solved.

According to the present invention, however, the difficulties heretofore encountered have been substantially eliminated while effecting reaction within a relatively short period of time.

Pursuant to the instant discovery, it has been found that the induction period and the overall reaction time may be substantially reduced in a surprisingly straightforward manner. This is accomplished by introducing into a reaction vessel which is charged with reaction liquid, i.e. water, solvent and a nickel salt-copper salt catalyst combination, acetylene and carbon monoxide and then terminating the flow of each of the reactant gases. After initiation of the reaction, approximately equivalent quantities of acetylene and carbon monoxide are then again added to the vessel and the reaction is allowed to proceed in a continuous manner. That the reaction has been initiated is usually indicated by a pressure drop within the reaction vessel of from about 50 to about 150 pounds per square inch gauge.

While the use of excess acetylene during the entire course of the reaction has been previously known to reduce the overall reaction time and to improve the yield of acrylic acid obtained by such process, in contrast thereto it has been discovered that pretreatment of the reaction liquid with an acetylene-carbon monoxide mixture whereby initiation takes place is surprisingly effective in allowing a continuous process reaction to rapidly reach a high rate level. By this procedure, a continuous process for the production of acrylic acid is made in part a batch process. In other words, after the introduction of liquid and gas into a suitable reaction vessel, the flow of each is terminated at which time initiation of the reaction takes place. Subsequently, the reaction is conducted as in a continuous process at an elevated temperature and an elevated pressure.

It is an advantage of the present invention that the pretreatment of the reaction liquid; that is, water, solvent and nickel salt-copper salt catalyst combination, with an acetylene-carbon monoxide mixture permits the reaction to take place more smoothly and easily following the induction period which is reduced from a period of hours to minutes because of such procedure.

The manner or mechanism by which this activation occurs is not known. It is possible that in the initiation stage an active intermediate or acrylic acid precursors, the structure of which is uncertain, may be found. Such an intermediate would form acrylic acid which may also be an important factor in speeding up the reaction rate. It is to be understood, however, that no intention to be bound to a theoretical explanation is expressed herein.

In general, the reaction may be conducted in the presence of a wide variety of nickel salt-copper salt catalyst combinations. Thus, for example, a nickel halide such as nickel chloride, nickel bromide or nickel iodide in combination with a copper halide such as copper chloride, copper bromide or copper iodide is satisfactory. Particularly advantageous, however, is the use of a combination of catalysts comprising a nickel or copper hydrocarbon sulfonate together with a nickle or copper halide. The use of such combination of catalysts of this type is described and claimed in copending application, Serial No. 776,403, filed November 26, 1958, now United States Patent No. 3,025,322. Illustrative metal hydrocarbon sulfonate catalysts suitable for use in the process of the present invention are nickel methane sulfonate, nickel ethane sulfonate, copper ethane sulfonate, nickel hexane sulfonate, copper hexane sulfonate, nickel benzene sulfonate, copper benzene sulfonate, nickel isopropylbenzene sulfonate, copper isopropylbenzene sulfonate, nickel paratoluene sulfonate, copper paratoluene sulfonate, nickel decylbenzene sulfonate, copper decylbenzene sulfonate, nickel 2-naphthalene sulfonate, copper 2-naphthalene sulfonate, nickel dodecylbenzene sulfonate, copper dodecylbenzene sulfonate, nickel bis(2,2-ditolybutane)sulfonate, copper bis(2,2-ditolybutane)sulfonate, nickel bis-(2,2-diphenylbutane)sulfonate, copper bis(2,2-diphenylbutane)sulfonate, nickel bis(1,1-dixylylethane)sulfonate, copper bis(1,1-dixylylethane)sulfonate, and the like and mixtures thereof.

In conjunction with such metal hydrocarbon sulfonate catalysts, nickel or copper halides such as nickel chloride, copper chloride, nickel bromide, copper bromide, nickel iodide, copper iodide and mixtures thereof may be used.

Best results are usually achieved when the hydrocarbon sulfonate and the halide have different metal cations. For instance, when nickel para-toluene sulfonate is the metal sulfonate, a copper halide, such as copper bromide, is used. Similarly, when copper para-toluene sulfonate is the metal sulfonate, a nickel halide such as nickel bromide, is used.

Very desirable results are obtained when a nickel-containing catalyst is present in a molar excess with respect to the copper catalyst, usually in the mole ratio range of 2:1 to 4:1. However, the range of 1:1 to 6:1 is also suitable.

Generally, the catalysts are present in sufficient quantity to provide from 0.1 to 8.0 percent by weight of nickel salt, preferably 0.2 to 5.0 percent by weight, basis the total weight of non-gaseous mixture. Likewise, a sufficient quantity of catalyst is generally present to provide from 0.02 to 5.0 percent by weight copper salt, preferably from 0.5 to 1.0 percent by weight, basis the total weight of the non-gageous reaction mixture.

By the expression "non-gaseous" reaction mixture as used herein, the non-gaseous components charged to the reactor, i.e., the solvent, water and catalyst, are intended.

In carrying out the reaction of acetylene, carbon monoxide and water in the presence of a catalyst combination as contemplated herein, it is very advantageous to use an excess by volume of an inert oxygen-containing organic solvent which is inert to the reactants under the reaction conditions and miscible with water. In other words, the solvents are not irreversibly changed by the presence of water and are not able to react with acetylene or carbon monoxide. The solvents, therefore, should not contain free hydroxy, mercapto, or carboxy groups, olefinic or acetylenic linkages, or primary or secondary amino groups. The boiling points of the solvents are preferably below that of acrylic acid.

Preferred solvents are cyclic ethers, such as tetrahydrofuran, dioxane, and saturated aliphatic ketones, such as acetone, methyl ethyl ketone and diethyl ketone.

While a slight excess of the solvent with respect to water employed is suitable, for example, 60 parts by volume of solvent for 40 parts by volume of water, much greater excesses of the liquid organic solvent are preferred. For instance, a volume ratio of solvent to water in the range of about 75:25 to about 95:5 is desirable.

While an equimolar ratio of acetylene to carbon monoxide is generally used prior to and after the induction period, the instant invention also contemplates the use of an excess of either of these reactants up to about 100 molar percent or more. In other words, a mole ratio of acetylene to carbon monoxide of from about 2:1 to about 1:2 may be employed.

The reactions contemplated herein advantageously may be conducted at temperatures as low as 150° C. and as 220° C. Preferably, reaction temperatures in the range of about 160° C. to about 205° C. are employed. On the other hand, total pressures as low as 300 pounds per square inch gauge and as high as about 900 pounds per square inch gauge are suitable, yet total pressures in the range of about 450 pounds per square inch gauge to 840 pounds per square inch gauge are preferred. Much higher total pressures may also be employed; for example, up to several thousand pounds providing, however, that the partial pressure of acetylene in the gaseous phase does not exceed about 450 pounds.

The process of the instant invention may be conducted in a batch, semi-continuous and continuous manner.

The water component utilized in the instant discovery may be present in an equivalent amount, basis the acetylene and carbon monoxide reactants. More commonly, however, these gaseous components are used in excess over the water. An excess of acetylene and/or carbon monoxide over water of 10 to 20 molar percent or more, for example, is often desirable, but not essential.

In order to facilitate an understanding of the present invention, the following illustrative examples are given:

EXAMPLE 1

A solution of catalyst in a 12% solution of water in acetone is charged to a reaction vessel at the same time feeding an equimolar mixture of carbon monoxide and acetylene in an amount calculated to give the desired conversion of water to acrylic acid. When the reactor is fully charged with liquid and gas and brought to temperature, no further liquid feed is introduced. A trickle of gas is maintained for purposes of agitation. Within 20-30 minutes, the reaction is initiated as evidenced by a pressure drop from 720 to 620 p.s.i.g. Thereafter, the reaction is continued in the usual continuous manner, introducing both liquid and gas mixture and purging reaction solution and sufficient unreacted gas so as to maintain the total pressure at 650-750 p.s.i.g.

The following table contains a summary of experimental results obtained when the procedure outlined above was followed and demonstrates the effect on percent conversion to acrylic acid by pretreatment of the reaction medium with an acetylene-carbon monoxide mixture.

*Table I*

EFFECT ON CONVERSION OF PRETREATMENT WITH ACETYLENE-CARBON MONOXIDE MIXTURE

| Run | Sample | Temperature, °C. | Catalyst | Pretreatment | Conversion to Acrylic Acid (Percent) |
|---|---|---|---|---|---|
| 130 | 1 | 185 | 0.2% NiBr$_2$·3H$_2$O, 0.05% CuBr$_2$, 0.15% hydroquinone inhibitor. | Yes | 17.9 |
| 130 | 2 | 185 | do | Yes | 16.5 |
| 130 | 3 | 185 | do | Yes | 14.8 |
| 131 | 1 | 185 | do | No | 3.5 |
| 131 | 3 | 185 | do | No | 8.5 |
| 134 | 2 | 185 | do | No | 4.6 |
| 135 | 1 | 185 | do | Yes | 15.7 |
| 137 | 4 | 185 | do | Yes | 25.0 |
| 144 | 3 | 185 | do | Yes | 24.1 |
| 144 | 9 | 185 | do | Yes | 20.8 |
| 132 | 2 | 195 | 0.2-0.5% nickel bromide or nickel decylbenzene sulfonate and 0.05-0.2% copper decylbenzene sulfonate or copper bromide. | No | 0.3 |
| 132 | 5 | 195 | do | No | 0.2 |
| 133 | 2 | 195 | do | No | 1.2 |
| 133 | 4 | 195 | do | No | 2.5 |
| 136 | 2 | 195 | do | Yes | 21.4 |
| 136 | 4 | 195 | do | Yes | 21.6 |
| 138 | 2 | 195 | do | Yes | 22.9 |
| 138 | 4 | 195 | do | Yes | 22.1 |
| 140 | 2 | 195 | do | Yes | 19.7 |
| 140 | 4 | 195 | do | Yes | 19.8 |

EXAMPLE 2

In order to further substantiate the results discussed in Table I, and to demonstrate the utility of the process of the present invention for batch as well as for continuous reactions, a number of runs were carried out in batch autoclaves.

In this procedure, a suitable pressure vessel is charged with a reaction mixture containing a 12% solution of water in acetone, 0.2% NiBr$_2$·3H$_2$O, 0.05% CuBr$_2$ and 0.1% hydroquinone inhibitor and then heated to the desired reaction temperature and treated with an equimolar mixture of carbon monoxide and acetylene. After the pressure within the vessel has reached approximately 700 pounds per square inch gauge, the flow of acetylene and carbon monoxide is halted. A rapid pressure drop is observed in a short time.

The flow of acetylene and carbon monoxide is then resumed and the reaction is allowed to continue.

In five of the runs (i.e., Nos. 5, 6, 10, 8 and 17), the flow of acetylene and carbon monoxide is not terminated but is continued at a rate calculated to give the desired conversion.

The results of these runs are summarized in Table II wherein the induction time represents the number of minutes for a 100 pound per square inch gauge pressure drop to occur.

From these results, it will be readily observed that pretreatment of the reaction medium is notably effective in reducing the period for induction. As a consequence, the overall time for the synthesis of acrylic acid is markedly lessened.

*Table II*

BATCH INDUCTION TESTS

| Run No. | Temperature, °C. | Gas Pretreatment | Induction Time, Minutes |
|---|---|---|---|
| 5 | 185 | No | 152 |
| 6 | 195 | No | 79 |
| 10 | [1] 185 | No | 93 |
| 8 | [1] 195 | No | 38 |
| 17 | 195 | No | 72 |
| 11 | 185 | Yes | 8 |
| 9 | 195 | Yes | 0 |

[1] Twice the amount of catalyst employed.

EXAMPLE 3

A solution of 12% water in acetone containing 0.2% copper decylbenzene sulfonate and 0.15% hydroquinone is pumped into a stainless steel reactor of 3800 ml. capacity at a rate of 19.0 mmoles/minute. A mixture of approximately 50% acetylene and 50% carbon monoxide, molar, is continuously fed at the rate of 208 mmoles/minute. The reactor is heated to 195° C. with the feed streams continued until the total pressure is 720 p.s.i.g. At this point the feed streams are discontinued and the vessel is kept at 195° C. for 35 minutes near the end of which time the reaction has become initiated as evidenced by rapid pressure drop to about 600 p.s.i.g. The feed streams are resumed and the reaction continued at a high rate. The effluent product stream contains 21.1% acrylic acid as shown by distillation and hydrogenation.

While the present invention has been described in detail as to specific embodiments thereof, it is not intended that these details constitute undue limitations upon the scope of the invention, excepting, of course, insofar as these limitations appear in the appended claims.

I claim:

1. In a process for the preparation of acrylic acid by the reaction of acetylene, carbon monoxide and water in a reaction medium comprising said water, a nickel salt-copper salt catalyst combination, the nickel salt of said combination selected from the group consisting of nickel halides and nickel hydrocarbon sulfonates and mixtures thereof, and the copper salt of said combination selected from the group consisting of copper halides and copper hydrocarbon sulfonates and mixtures thereof, at least one of said salts of said combination being a halide and an oxygen-containing organic, water-miscible solvent at sufficiently elevated temperatures and pressures to form acrylic acid, the improvement therein of (1) first introducing a feed of acetylene and carbon monoxide into said reaction medium in an amount sufficient for initiation of reaction to take place, each of said acetylene and carbon monoxide being present in a mixture in an amount sufficient to reduce induction period, (2) terminating said feed of acetylene and carbon monoxide when an elevated pressure has been reached and (3) after initiation of the reaction has taken place, resuming said feed of acetylene and carbon monoxide into said reaction medium and carrying out said reaction at an elevated temperature and an elevated pressure.

2. The process of claim 1 in which said nickel salt is a nickel halide and said copper salt is a copper halide.

3. The process of claim 1 in which said copper salt is a copper hydrocarbon sulfonate.

4. The process of claim 1 in which said nickel salt is a nickel hydrocarbon sulfonate.

5. A process according to claim 1, in which said elevated temperatures and pressures range from 160° C. up to about 205° C. at total pressures of from about 450 pounds up to about 840 pounds, said partial acetylene pressure ranging up to 450 pounds, said solvent and water being in a relative volume ratio ranging from about 75:25 to about 95:5 of solvent:water, said catalyst being present in an amount ranging from 0.2 to 5% by weight of said nickel salt, and from 0.5 to 1% by weight of said copper salt, based on the total weight of non-gaseous reaction mixture, and said acetylene and carbon monoxide being in a relative mole ratio ranging from about 2:1 to about 1:2.

6. A process according to claim 5, in which said solvent is selected from the group consisting of tetrahydrofuran, dioxane, acetone, methyl ethyl ketone and diethyl ketone.

References Cited by the Examiner

UNITED STATES PATENTS 2,613,222 10/1952 Specht _____ 260—533
3,025,322 3/1962 Smolin et al. _____ 260—533

LORRAINE A. WEINBERGER, *Primary Examiner.*

CHARLES B. PARKER, LEON ZITVER, *Examiners.*

G. P. D'ANGELO, I. R. PELLMAN, L. A. THAXTON,
*Assistant Examiners.*